(12) United States Patent
Wang et al.

(10) Patent No.: US 11,378,722 B2
(45) Date of Patent: Jul. 5, 2022

(54) OPTICAL LENS HEAD, CAMERA MODULE AND ASSEMBLING METHOD THEREFOR

(71) Applicant: Ningbo Sunny Opotech Co., Ltd., Ningbo (CN)

(72) Inventors: Mingzhu Wang, Ningbo (CN); Nan Guo, Ningbo (CN); Heng Jiang, Ningbo (CN); Chunmei Liu, Ningbo (CN)

(73) Assignee: Ningbo Sunny Opotech Co., Ltd.

( * ) Notice: Subject to any disclaimer, the term of this patent is extended or adjusted under 35 U.S.C. 154(b) by 166 days.

(21) Appl. No.: 16/073,671

(22) PCT Filed: Jan. 18, 2017

(86) PCT No.: PCT/CN2017/071489
§ 371 (c)(1),
(2) Date: Jul. 27, 2018

(87) PCT Pub. No.: WO2017/129006
PCT Pub. Date: Aug. 3, 2017

(65) Prior Publication Data
US 2019/0064399 A1    Feb. 28, 2019

(30) Foreign Application Priority Data

Jan. 28, 2016    (CN) .......................... 201610059165.5

(51) Int. Cl.
*G02B 5/00*    (2006.01)
*H04N 5/225*    (2006.01)
(Continued)

(52) U.S. Cl.
CPC .............. *G02B 5/005* (2013.01); *G02B 7/021* (2013.01); *G03B 17/12* (2013.01); *H04N 5/2254* (2013.01); *H04N 5/2257* (2013.01)

(58) Field of Classification Search
CPC ........ G02B 5/005; G02B 7/021; G03B 17/12; H04N 5/2254; H04N 5/2257
See application file for complete search history.

(56) References Cited

U.S. PATENT DOCUMENTS 6,898,030 B1    5/2005  Lin et al.
7,605,991 B2 *  10/2009 Chiang ................ G02B 13/009
                                                                    359/811
(Continued)

FOREIGN PATENT DOCUMENTS

CN    200993689 Y    12/2007
CN    102053330 A     5/2011
(Continued)

OTHER PUBLICATIONS

International Search Report for PCT/CN2017/071489 dated Apr. 5, 2017, 8 pages.

*Primary Examiner* — Joseph P Martinez
*Assistant Examiner* — Vipin Patel
(74) *Attorney, Agent, or Firm* — Barnes & Thornburg LLP

(57) ABSTRACT

An optical lens head, an camera module, and an assembling method therefor, wherein the camera module comprises a photosensitive chip (23) and an optical lens head (10); said optical lens head (10) comprises a plurality of optical lenses (111); the assembly position of one of the optical lenses (111) is adjustable; each of the optical lenses (111) is black-lacquered and matte-treated; a connecting portion (1113), a light-beam entrance hole (1114) and a light-shielding portion (1115) are formed on the corresponding optical lenses (111), such that the individual optical lenses (111) can be successively and jointly assembled together, eliminating the need of a spacing ring, a diaphragm, a lens barrel and other structural components used in a conven- (Continued)

tional camera module, thereby improving manufacture precision, production yield and imaging quality of the camera module.

12 Claims, 10 Drawing Sheets

(51) Int. Cl.
*G02B 7/02* (2021.01)
*G03B 17/12* (2021.01)

(56) References Cited

U.S. PATENT DOCUMENTS

| | | | |
|---|---|---|---|
| 8,000,041 B1* | 8/2011 | Lin | B29D 11/00375 359/619 |
| 9,759,885 B2* | 9/2017 | Yan | G02B 7/003 |
| 2005/0237418 A1 | 10/2005 | Sakamoto | |
| 2008/0118241 A1 | 5/2008 | TeKolste et al. | |
| 2008/0180566 A1* | 7/2008 | Singh | H04N 5/2254 348/373 |
| 2008/0225420 A1* | 9/2008 | Barrows | G06T 7/246 359/850 |
| 2008/0259449 A1* | 10/2008 | Fruhmann | G01C 3/08 359/425 |
| 2009/0002853 A1 | 1/2009 | Yuan | |
| 2010/0031880 A1 | 2/2010 | Lin | |
| 2010/0140459 A1* | 6/2010 | Tatsuzawa | G02B 7/021 250/216 |
| 2010/0284077 A1 | 11/2010 | Shyu et al. | |
| 2011/0150459 A1* | 6/2011 | Chang | G02B 13/003 396/529 |
| 2013/0070101 A1 | 3/2013 | An et al. | |
| 2013/0076971 A1* | 3/2013 | Nishimoto | G02B 7/02 348/360 |
| 2014/0078606 A1* | 3/2014 | Wu | G02B 7/02 359/827 |
| 2015/0103407 A1* | 4/2015 | Chen | G02B 1/11 359/601 |
| 2016/0011415 A1 | 1/2016 | Takada | |

FOREIGN PATENT DOCUMENTS

| | | | |
|---|---|---|---|
| CN | 102103244 A | 6/2011 | |
| CN | 103376481 A | 10/2013 | |
| CN | 103676062 A | 3/2014 | |
| CN | 203759339 U | 8/2014 | |
| CN | 104865680 A | 8/2015 | |
| CN | 105022139 A | 11/2015 | |
| JP | 2000324301 A | 11/2000 | |
| JP | 2004334048 A | 11/2004 | |
| JP | 2005018024 A | 1/2005 | |
| JP | 3154544 U | 10/2009 | |
| JP | 2009282264 | 12/2009 | |
| JP | 2010197816 A | 9/2010 | |
| JP | 2011508914 A | 3/2011 | |
| JP | 2011100056 A | 5/2011 | |
| JP | 2014156954 A | 8/2014 | |
| JP | 2014170253 A * | 9/2014 | |
| JP | 2015106005 A | 6/2015 | |
| KR | 20120057614 A | 6/2012 | |
| KR | 20140023758 A | 2/2014 | |
| WO | 2013015406 A1 | 1/2013 | |
| WO | 2014156954 | 10/2014 | |
| WO | WO-2014156954 A1 * | 10/2014 | G02B 27/0018 |

* cited by examiner

OPTICAL LENS HEAD, CAMERA MODULE AND ASSEMBLING METHOD THEREFOR

CROSS-REFERENCE TO RELATED APPLICATIONS

This application is a national stage of International Application No. PCT/CN2017/071489, filed on Jan. 18, 2017, which claims priority to Chinese Patent Application No. 201610059165.5, filed on Jan. 28, 2016. Both of the aforementioned applications are hereby incorporated by reference in their entireties.

TECHNICAL FIELD

The present disclosure relates to the field of camera modules, and particularly relates to an optical lens assembly, a camera module, and assembly methods thereof.

BACKGROUND

In a conventional assembly process of a camera module, a lens assembly is an independently assembled component, and includes a lens barrel (including a diaphragm), a lens, a spacer ring, a stopper and other structures. The assembly process of the lens assembly includes: mounting the spacer ring and lens into the lens barrel in sequence, pressing the spacer ring on the lens, fixing the spacer ring with the side wall of the lens barrel through adhesive dispensing, and fixing the last lens with glue or a stopper to realize the assembly of the lens assembly. The precision of assembling the spacer ring and manufacturing the diaphragm is much lower than that of machining and manufacturing the lenses, there is a risk of assembly deviation for connecting the lenses by the spacer ring and the stopper, and the machining precision is poor or the thickness is large, such that stray lights of an optical system are likely caused to affect the imaging quality; or the lenses are eccentric or skewed due to the tolerance of the components of the lens assembly or a poor assembly technology, thus affecting the optical performance of the lens module. Moreover, the above manufacture steps are complicated, and have many working procedures and a high cost, the quality of the manufactured product is difficult to be controlled and productivity and yield can not be improved.

In addition, when the conventional lens assembly is assembled, a plurality of lenses need to be connected with spacer rings, and the spacer rings need to occupy spaces, thus increasing the lens size and thus increasing the module size, which not only consumes raw materials, but also is not conducive to developing a thin and light product; moreover, the fixation of the lenses must use glue, and the components of the lens assembly can only be fixed by adhesive dispensing one by one, thus reducing the production efficiency and further leading to high production cost.

At present, the camera module has been gradually developed to new materials, high pixels and miniaturization, which drives the improvement of the conventional design to improve the imaging quality, production efficiency and product yield of the camera module.

SUMMARY

An objective of the present disclosure includes providing an optical lens assembly, a camera module, and assembly methods thereof, where the lenses are assembled without connecting a structural member, and are assembled by lens embedding, so that the assembly precision is high, the tolerance is low, and the imaging quality of the lenses and the camera module is high.

An objective of the present disclosure includes providing an optical lens assembly, a camera module, and assembly methods thereof. According to an optical path design, a partial portion of an optical lens is opaqued to arrange a connecting portion to directly embedding optical lenses, so that the spacer ring in the conventional camera module is omitted, the tolerance brought by assembly of the spacer ring is avoided, the assembly precision is improved, the manufacturing of the lens assembly and the camera module is simpler, and the production efficiency is higher.

An objective of the present disclosure includes providing an optical lens assembly, a camera module and assembly methods thereof. The lens assembly or the camera module uses lenses on which a blackening process and a matting process are performed and does not use structural members for connection, so that the cost is reduced.

An objective of the present disclosure includes providing an optical lens assembly, a camera module and assembly methods thereof. The blackening process and the matting process of a lens replaces a structural member, so that for the optical assembly or the camera module, the thickness is reduced, the processing precision is improved, stray lights of an optical system is reduced, and the imaging quality and manufacturing yield are improved.

An objective of the present disclosure includes providing an optical lens assembly, a camera module and assembly methods thereof. After an optical lens is partially blackened, a light beam entering hole is formed in a photosensitive area to replace a diaphragm in the conventional camera module, so that the camera module is more compact in structure and smaller in volume.

An objective of the present disclosure includes providing an optical lens assembly, a camera module and assembly methods thereof, where a blackening process and a matting process are performed on an edge of a lens, so that a black objective lens barrel structural member in the conventional camera module may be replaced to facilitate the development of a thin and light camera module.

An objective of the present disclosure includes providing an optical lens assembly, a camera module and assembly methods thereof. A lens barrel is sleeved outside the camera module to play a protective role and can improve the reliability of the product.

Another objective of the present disclosure includes providing an optical lens assembly, a camera module and assembly methods thereof, where after the blackening process and the matting process are performed on the edge of the optical lens to form a light blocking portion, if a lens barrel structural member is mounted to further protect the optical lens, the lens barrel structural member may be selected from a transparent or a non-transparent member, the selection range is wider, and the reduction of the cost is also facilitated.

An objective of the present disclosure includes providing an optical lens assembly, a camera module and assembly methods thereof, the assembly method is simple, and the working performance is reliable.

An objective of the present disclosure includes providing an optical lens assembly, a camera module and assembly methods thereof. The imaging quality of the camera module is relatively high by adopting an optical system structure and the assembly methods related to the high-precision and ultra-thin diaphragm, spacer ring, stopper and lens barrel according to the present disclosure.

An objective of the present disclosure includes providing an optical lens assembly, a camera module and assembly methods thereof, where a photosensitive device may be manufactured by adopting a COB process or a flip chip.

An objective of the present disclosure includes providing an optical lens assembly, a camera module and assembly methods thereof, where glue is avoided in the assembly of a lens subassembly, thereby ensuring the precision and cleanliness of a lens, which is beneficial to improving the imaging quality.

An objective of the present disclosure includes providing an optical lens assembly, a camera module and assembly methods thereof. After an adjustable lens is pre-assembled, the imaging quality of the camera module is adjusted by adjusting the assembly position of the adjustable lens, so that the imaging of the camera module meets expected a resolution requirement to facilitate ensuring the imaging quality and manufacturing yield of the camera module.

An objective of the present disclosure includes providing an optical lens assembly, a camera module and assembly methods thereof. The position of the pre-assembled adjustable lens is adjusted in at least one direction; and by adjusting the adjustable lens, it is suitable for calibrating the optical center of a lens, omitting a focusing step, and improving the production efficiency.

In order to achieve at least one of the above objectives, one aspect of the present disclosure provides a camera module including:

an optical lens assembly; and a photosensitive device, where the photosensitive device includes a color filter, a lens holder, a photosensitive chip and a circuit board, the color filter is mounted in an inner space of a top portion of the lens holder, the photosensitive chip is mounted on or above the circuit board and located inside the lens holder, and the circuit board is mounted at the bottom of the lens holder;

the optical lens assembly includes a lens subassembly, the lens subassembly includes a plurality of optical lenses, the optical lenses are sequentially embedded and self-assembled to form the lens subassembly, and the lens subassembly is mounted on a photosensitive path of the photosensitive chip; and each optical lens has a connecting portion arranged on a surface of the optical lens by coating a black adhesive, and the connecting portion is adapted to connect the optical lenses to directly connect the optical lenses.

According to some embodiments, an edge of the optical lens in the camera module is provided with a light blocking portion to block external lights, and the light blocking portion is formed by a blackening process and a matting process.

According to some embodiments, in the camera module, the optical lenses each have a photosensitive area and a non-photosensitive area, and for one of the optical lenses, a light beam entering hole is formed in the photosensitive area and the blackening process and the matting process are performed on the entire optical lens except the light beam entering hole to form the non-photosensitive area.

According to some embodiments, the optical lens arranged at the top of the optical lens assembly in the camera module is pre-assembled, and an assembly position of the pre-assembled optical lens is suitable to be adjusted in at least one direction.

According to some embodiments, the blackening process and the matting process in the camera module are selected from a combination of one or more of paint spraying, ink coating, screen printing and photoetching.

According to some embodiments, the optical lens assembly in the camera module includes a lens barrel structural member, the lens subassembly is mounted inside the lens barrel structural member, and the lens barrel structural member is mounted on the top of the photosensitive device.

Another aspect of the present disclosure provides a camera module including:

an optical lens assembly; and a photosensitive device, where the photosensitive device is assembled by adopting flip-chip bonding, and includes a color filter, a lens holder, a photosensitive chip and a circuit board, the color filter and the photosensitive chip are mounted on the lens holder respectively, the circuit board is mounted at the bottom of the lens holder, and the lens holder has an electrical function;

the optical lens assembly includes a lens subassembly, the lens subassembly includes a plurality of optical lenses, the optical lenses are sequentially embedded and self-assembled to form the lens subassembly, and the lens subassembly is mounted on a photosensitive path of the photosensitive chip; and each optical lens has a connecting portion arranged on a surface of the optical lens by coating a black adhesive and the connecting portion is adapted to connect the optical lenses to directly connect the optical lenses.

According to some embodiments, an edge of the optical lens in the camera module is provided with a light blocking portion to block external lights, and the light blocking portion is formed by the blackening process and the matting process.

According to some embodiments, in the camera module, the optical lenses each have a photosensitive area and a non-photosensitive area, and for one of the optical lenses, a light beam entering hole is formed in the photosensitive area and the blackening process and the matting process are performed on the entire optical lens except the light beam entering hole to form the non-photosensitive area.

According to some embodiments, the optical lens arranged at the top of the optical lens assembly in the camera module is pre-assembled, and an assembly position of the pre-assembled optical lens is suitable to be adjusted in at least one direction.

According to some embodiments, the blackening process and the matting process in the camera module are selected from a combination of one or more of paint spraying, ink coating, screen printing and photoetching.

According to some embodiments, the optical lens assembly in the camera module includes a lens barrel structural member, the lens subassembly is mounted inside the lens barrel structural member, and the lens barrel structural member is mounted on the top of the photosensitive device.

Another aspect of the present disclosure provides an optical lens assembly including a plurality of optical lenses, the optical lenses are sequentially embedded and self-assembled to form a lens subassembly, each optical lens has a connecting portion arranged on a surface of the optical lens by coating a black adhesive, and the connecting portion is adapted to connect the optical lenses to directly connect the optical lenses.

According to some embodiments, an edge of the optical lens in the optical lens assembly is provided with a light blocking portion to block external lights, and the light blocking portion is formed by a blackening process and a matting process.

According to some embodiments, the optical lenses each have a photosensitive area and a non-photosensitive area, and for one of the optical lenses, a light beam entering hole is formed in the photosensitive area and the blackening process and the matting process are performed on the entire lens except the light beam entering hole to form the non-photosensitive area.

According to some embodiments, the optical lens arranged at the top of the optical lens assembly in the optical lens assembly is pre-assembled, and an assembly position of the pre-assembled optical lens is suitable to be adjusted in at least one direction.

According to some embodiments, the blackening process and the matting process in the optical lens assembly are selected from a combination of one or more of paint spraying, ink coating, screen printing and photoetching.

According to some embodiments, the optical lens assembly includes a lens barrel structural member, the lens subassembly is mounted inside the lens barrel structural member, and the lens barrel structural member is mounted on the top of the photosensitive device.

In order to satisfy the above objectives of the present disclosure and other objectives and advantages of the present disclosure, the present disclosure provides a camera module including:

a photosensitive device, including a photosensitive chip;

an optical lens assembly, including a plurality of optical lenses, where each optical lens includes a connecting portion, and the optical lenses are sequentially embedded and overlappingly assembled together through the connecting portions to form a lens subassembly arranged on a photosensitive path of the photosensitive chip.

According to an embodiment of the present disclosure, the connecting portion is formed by coating a black adhesive on each optical lens, is arranged on a surface of the optical lens and is adapted to connect the optical lenses.

According to an embodiment of the present disclosure, for one of the optical lenses, a light beam entering hole is formed in the photosensitive area and a blackening process and a matting process are performed on the entire optical lens except the light beam entering hole to form the non-photosensitive area.

According to an embodiment of the present disclosure, at least one of the optical lenses is pre-assembled in the optical lens assembly, and an assembly position of the pre-assembled optical lens is suitable to be adjusted in at least one direction.

According to an embodiment of the present disclosure, the optical lens arranged at the top of the optical lens assembly is the pre-assembled optical lens.

According to an embodiment of the present disclosure, an edge of the lens subassembly is provided with a light blocking portion to block external lights.

According to an embodiment of the present disclosure, the blackening process and the matting process are performed on an edge of each optical lens to form the light blocking portion.

According to an embodiment of the present disclosure, the blackening process and the matting process is suitable to be selected from one or more of paint spraying, ink coating, screen printing and photoetching.

According to an embodiment of the present disclosure, the optical lens assembly further includes a lens barrel structural member, the lens subassembly is mounted inside the lens barrel structural member, and the lens barrel structural member is mounted on the top of the photosensitive device.

According to an embodiment of the present disclosure, the photosensitive device further includes a color filter, a lens holder, and a circuit board, the color filter and the photosensitive chip are mounted inside the lens holder respectively, the photosensitive chip is mounted on the circuit board, and the circuit board is mounted at the bottom of the lens holder.

According to an embodiment of the present disclosure, the photosensitive device is assembled by a flip chip, and further includes a color filter, a lens holder, and a circuit board, the color filter and the photosensitive chip are mounted inside the lens holder respectively, the photosensitive chip is connected to the lens holder, the circuit board is mounted at the bottom of the lens holder and is separated from the photosensitive chip, and the lens holder has an electrical function.

According to another aspect of the present disclosure, the present disclosure further provides an optical lens assembly, including:

a plurality of optical lenses, where each optical lens includes a connecting portion, and the optical lenses are sequentially embedded and overlappingly assembled together to form a lens subassembly through the connection of the connecting portions, and the connecting portion is arranged in a non-photosensitive area of each optical lens and is suitable for connecting the optical lenses.

According to an embodiment of the present disclosure, for one of the optical lenses, a light beam entering hole is formed in the photosensitive area and a blackening process and a matting process are performed on the entire optical lens except the light beam entering hole to form the non-photosensitive area.

According to an embodiment of the present disclosure, the optical lens arranged at the top of the optical lens assembly is provided with the light beam entering hole.

According to an embodiment of the present disclosure, at least one of the optical lenses is pre-assembled in the optical lens assembly, and an assembly position of the pre-assembled optical lens is suitable to be adjusted in at least one direction.

According to an embodiment of the present disclosure, the optical lens arranged at the top of the optical lens assembly is the pre-assembled optical lens.

According to an embodiment of the present disclosure, a non-photosensitive area of the optical lens is formed by a blackening process and a matting process, and the connecting portion is formed by coating a black adhesive on each of the optical lenses.

According to an embodiment of the present disclosure, an edge of the lens subassembly is provided with a light blocking portion to block external lights, and the light blocking portion is formed by performing the blackening process and the matting process on an edge of each optical lens.

According to an embodiment of the present disclosure, the optical lens assembly further includes a lens barrel structural member, and the lens subassembly is mounted inside the lens barrel structural member.

According to another aspect of the present disclosure, the present disclosure further provides an optical lens, including:

a photosensitive area and a non-photosensitive area, where the photosensitive area is adapted to allow lights to pass through the photosensitive area, and the non-photosensitive area is formed by opaquing the optical lens.

According to an embodiment of the present disclosure, a connecting portion is arranged in the non-photosensitive area of the optical lens by a blackening process and a matting process, and the connecting portion is adapted to embed and assemble optical lenses.

According to an embodiment of the present disclosure, the connecting portion is formed by arranging a black adhesive on a surface of the optical lens, and is adapted to connect the optical lenses.

According to an embodiment of the present disclosure, one of the optical lenses is provided with a light beam entering hole for receiving an incident light beam and limiting a size of the incident light beam.

According to an embodiment of the present disclosure, a light blocking portion is formed at an edge of the optical lens through the blackening process and the matting process, and is adapted to block lights.

According to another aspect of the present disclosure, the present disclosure further provides an assembly method of an optical lens assembly, including:

(a) embedding and assembling a plurality of optical lenses to form a lens subassembly;

(b) forming a light beam entering hole on one of the optical lenses in the lens subassembly; and (c) packaging the optical lens assembly.

According to an embodiment of the present disclosure, in the method, the step (b) is performed before the execution of the step (a).

According to an embodiment of the present disclosure, in the step (a), before assembling the optical lenses, a blackening process and a matting process are performed on each optical lens to form a non-photosensitive area and the entire optical lens except the non-photosensitive is a photosensitive area, and a connecting portion is arranged in the non-photosensitive area to connect the optical lenses.

According to an embodiment of the present disclosure, in the method, the connecting portion is formed by coating a black adhesive on a surface of the optical lens and is adapted to embed and assembly the optical lenses.

According to an embodiment of the present disclosure, in the step (b), the optical lens mounted on the top of the lens subassembly is provided with the light beam entering hole, and for the optical lens on the top of the lens subassembly, the light beam entering hole is formed in the photosensitive area and a blackening process and a matting process are performed on the entire optical lens except the light beam entering hole to form a non-photosensitive area to limit the size of an entering light beam.

According to an embodiment of the present disclosure, in the step (a), at least one of the optical lenses is pre-assembled as an adjustable lens, and an assembly position of the adjustable lens is suitable to be adjusted in at least one direction.

According to an embodiment of the present disclosure, in the method, the adjustable lens is pre-assembled at the top of the lens subassembly, and an optical center of the optical lens is calibrated by adjusting the adjustable lens.

According to an embodiment of the present disclosure, in the step (c), after the optical center of the optical lens is corrected through the adjustable lens, adhesive dispensing and curing are performed on the adjustable lens to fix the adjustable lens, thereby completing the assembly of the optical lens assembly.

According to an embodiment of the present disclosure, the assembly method further includes step (d): arranging a light blocking portion at an edge of the lens subassembly to blocking lights, where the step (d) is included in the step (a), performed between executions of the steps (a) and (b), or performed between executions of the steps (b) and (c).

According to an embodiment of the present disclosure, in the step (d), the light blocking portion is formed by performing a blackening process and a matting process on an edge of each of the optical lenses, and the blackening process and the matting process are performed before assembling the optical lenses, or after assembling the optical lenses.

According to an embodiment of the present disclosure, in the method, the blackening process and the matting process are suitable to be performed on the optical lenses by one or more of paint spraying, ink coating, screen printing and photoetching.

According to an embodiment of the present disclosure, the assembly method further includes step (e): mounting the lens subassembly inside a lens barrel structural member, where the step (e) is performed between executions of the steps (b) and (c).

According to an embodiment of the present disclosure, in the step (e), an edge of the lens subassembly is fixed to the inner wall of the lens barrel structural member by adhesive dispensing and curing.

According to another aspect of the present disclosure, the present disclosure further provides an assembly method of a camera module, including:

(A) sequentially embedding and assembling a plurality of optical lenses together to form a lens subassembly;

(b) arranging the lens subassembly on a photosensitive path of a photosensitive chip; and (c) forming a came module by packaging the lens subassembly and a photosensitive chip.

According to an embodiment of the present disclosure, in the step (A), a blackening process and a matting process are performed on each of the optical lenses, and each of the optical lenses is provided with a connecting portion after the blackening process and the matting process, and the optical lenses are embedded and assembled through the connecting portions.

According to an embodiment of the present disclosure, in the method, the connecting portion is formed by coating a black adhesive on a surface of the optical lens and is adapted to connect the optical lenses.

According to an embodiment of the present disclosure, in the step (A), for one of the optical lenses, a photosensitive area is provided with a light beam entering hole and a blackening process and a matting process are performed on the entire optical lens except the light beam entering hole to form a non-photosensitive area.

According to an embodiment of the present disclosure, in the step (A), the optical lens provided with the light beam entering hole is mounted at the top of the lens subassembly.

According to an embodiment of the present disclosure, in the step (A), at least one of the optical lenses in the lens subassembly is pre-assembled, an assembly position of the pre-assembled optical lens being adjustable, to form an optical lens assembly with an adjustable optical center, and all optical lenses except the pre-assembled optical lens are fixedly connected.

According to an embodiment of the present disclosure, the assembly method further includes step (D), the step (D) is performed between executions of the step (B) and the step (C), and the pre-assembled optical lens is adjusted to ensure that a central axis of the pre-assembled optical lens coincides with a central axis of the photosensitive chip or a deviation between the central axes is within an allowable range.

According to an embodiment of the present disclosure, in the step (D), adhesive dispensing and curing are performed on the pre-assembled optical lens after the pre-assembled optical lens is adjusted, to fix the pre-assembled optical lens.

According to an embodiment of the present disclosure, the assembly method further includes step (E): performing a blackening process and a matting process on an edge of each of the optical lenses to form a light blocking portion to block lights, where the step (E) is performed between executions of the step (A) and the step (B), or is included in the step (A).

According to an embodiment of the present disclosure, the assembly method further includes step (F): mounting the lens subassembly inside a lens barrel structural member, where the lens barrel structural member is assembled at the top of the photosensitive chip.

DETAILED DESCRIPTION OF EMBODIMENTS

Figure 1A:
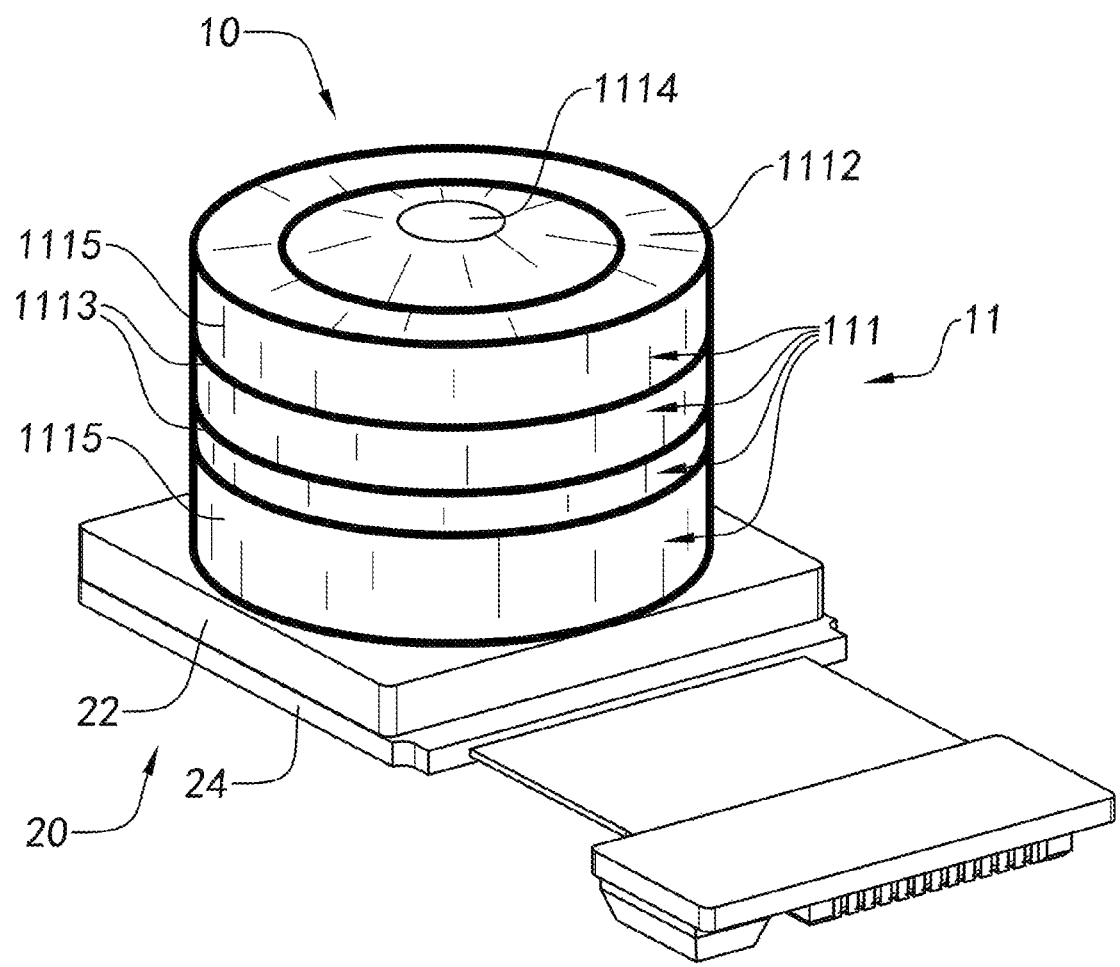
FIG. 1A is a schematic cross-sectional diagram of a camera module according to a first preferred embodiment of the present disclosure.
Figure 1B:
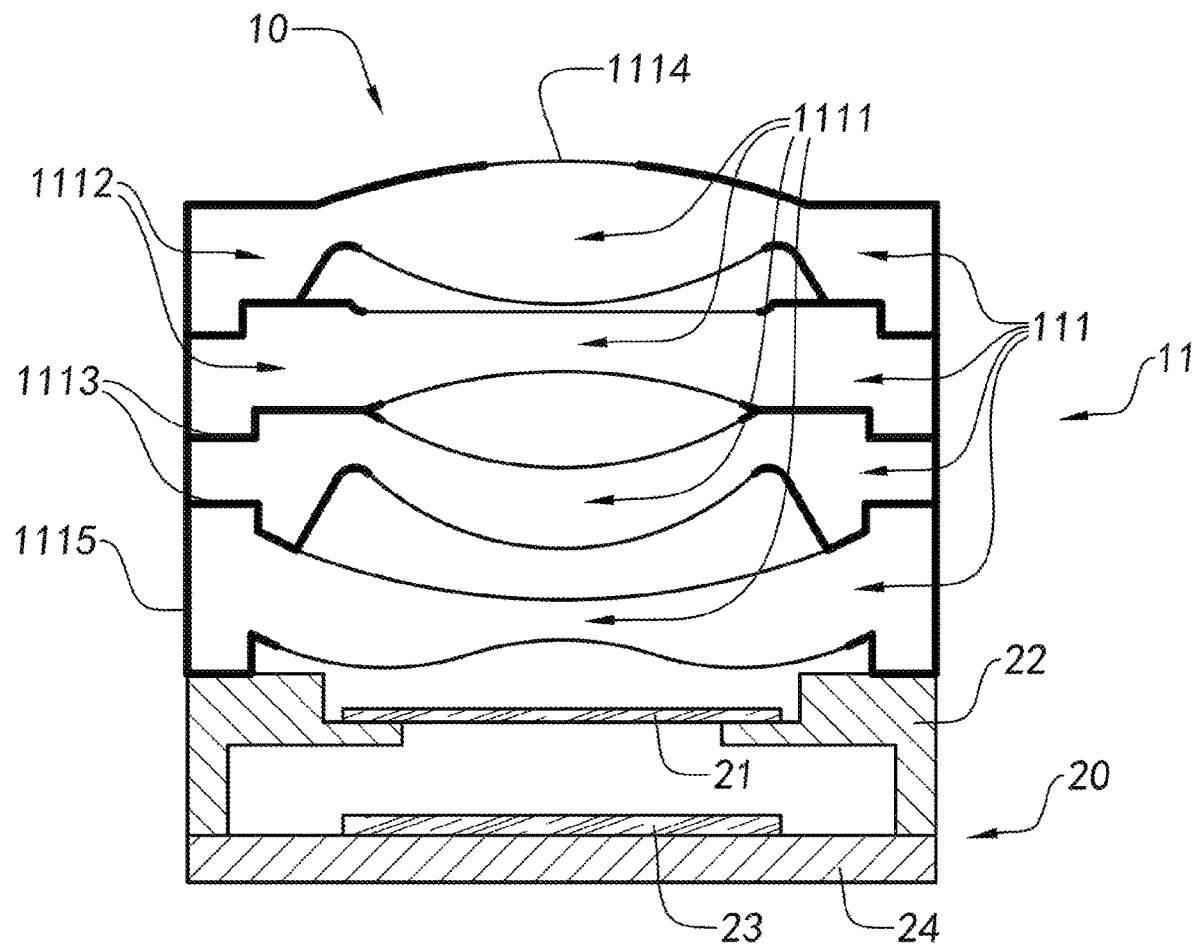
FIG. 1B is a three-dimensional structure diagram of the camera module according to the first preferred embodiment of the present disclosure.
Figure 2:
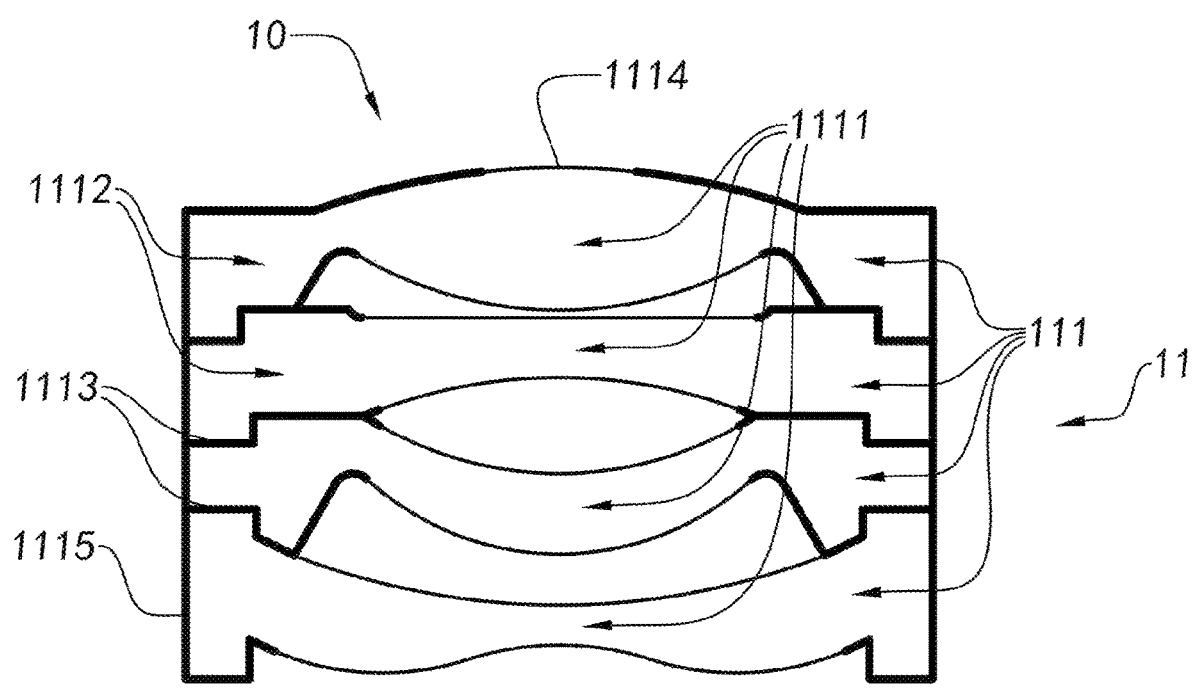
FIG. 2 is a schematic cross-sectional diagram of an optical lens assembly according to the first preferred embodiment of the present disclosure.
Figure 3:
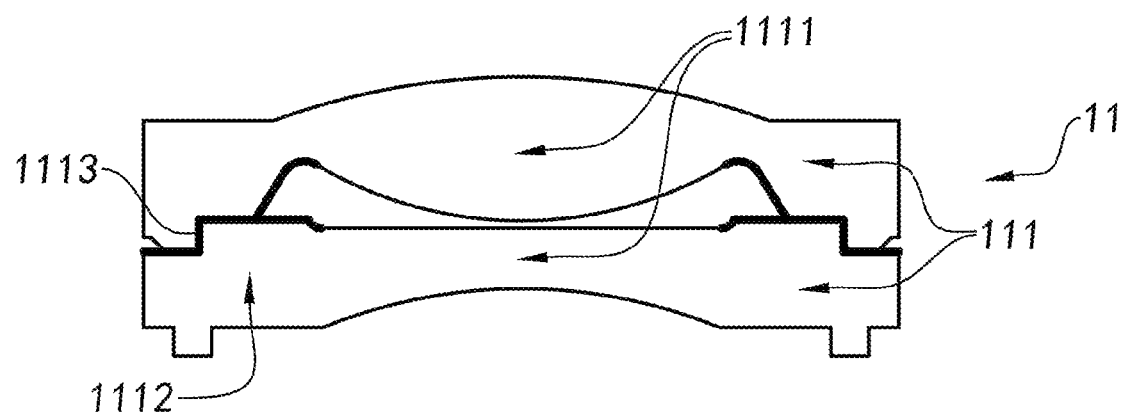
FIG. 3 is a schematic cross-sectional diagram of a lens subassembly according to the first preferred embodiment of the present disclosure.
Figure 4:
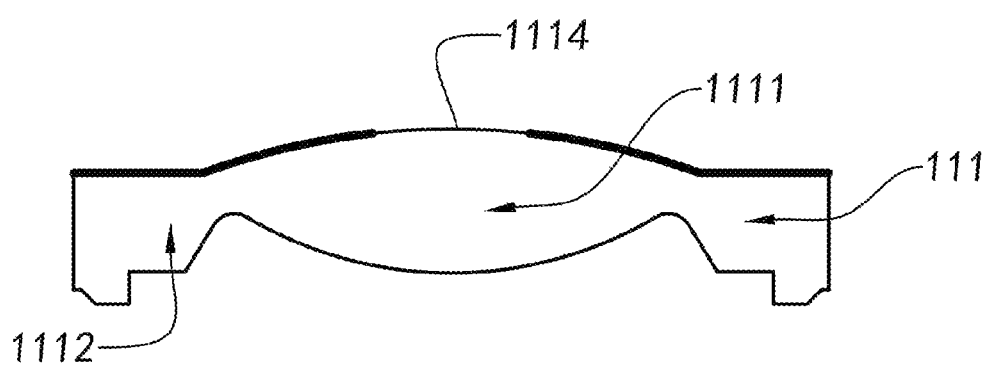
FIG. 4 is a schematic cross-sectional diagram of a lens included in an optical system structure according to the first preferred embodiment of the present disclosure.

The following description is provided to disclose the present disclosure to enable those skilled in the art to implement the present disclosure. Preferred embodiments are provided in the following description only as examples and modifications will be apparent to those skilled in the art. The general principles of the present disclosure defined in the following description may be applied to other embodiments, alternatives, modifications, equivalents, and other technical solutions without departing from the spirit and scope of the present disclosure.

Referring to FIG. 1A to FIG. 4, a first specific implementation of an optical system structure according to the present disclosure will be explained. As shown in FIG. 1A to FIG. 4, an camera module includes an optical lens assembly 10 and a photosensitive device 20; the photosensitive device 20 is manufactured by a COB (chip on board) process and includes a color filter 21, a lens holder 22, a photosensitive chip 23 and a circuit board 24, and the color filter 21 is an optical filter such as an infrared cut-off filter, and is mounted in an internal space at the top of the lens holder 22; the photosensitive chip 23 is mounted on the circuit board 24, and is located inside the lens holder 22; the circuit board 24 is mounted at the bottom of the lens holder 22, the photosensitive chip 23 is not in direct contact with and is separated from the lens holder 22; the optical lens assembly 10 includes a lens subassembly 11 that includes a plurality of optical lenses 111, the lens subassembly 11 includes four optical lenses in some embodiments, and the optical lenses 111 are sequentially embedded and assembled to form the lens subassembly 11; the lens subassembly 11 is mounted on a photosensitive path of the photosensitive chip 23 and at the top of the lens holder 22; when lights reflected by an object enter into the camera module through the optical lens assembly 10, the lights are received and photoelectrically converted by the photosensitive chip 23, so that the camera module can generate images related to the object.

In the optical lens assembly 10, by designing an optical path structure for each optical lens 111, for the optical lens assembly 10, components such as a spacer ring, a diaphragm, and a lens barrel structural member can be omitted, tolerances brought in processes of assembling the spacer ring, the diaphragm, and the lens barrel structural member are avoided, the machining precision is improved, the volume is reduced and the imaging quality is improved.

Specifically, according to the optical path design, a partial area of the optical lens 111 is opaqued to ensure that each optical lens 111 has a photosensitive area 1111 and a non-photosensitive area 1112, where in the present preferred embodiment, the non-photosensitive area 1112 is formed by performing a blackening process and a matting process on the optical lens 111, that is, the blackening process and the matting process are performed on the front and back surfaces of each optical lens 111, the part on which the blackening process and the matting process are not performed is the photosensitive area 1111, and the part on which the blackening process and the matting process are performed is the non-photosensitive area 1112.

Further, the surface of the optical lens 111 is coated with a black adhesive to form a connecting portion 1113; preferably, the connecting portion 1113 has viscosity, is located in the non-sensitive area 1112, and is suitable for embedding and assembling the optical lens 111 to form the lens subassembly 11; and in the optical lens assembly 10, the optical lenses 111 are embedded and assembled through the connecting portion 1113, without the spacer ring used for assembling lenses in the conventional camera module, the connecting portion 1113 is located at the same position as the spacer ring in the conventional lens assembly, and the function of the connecting portion is the same as that of the spacer ring. The assembly having lenses directly embedded has a low assembly accuracy, a low cost and a lower tilt tolerance, which is beneficial for ensuring the production yield and efficiency of the camera module and improving the imaging quality of the camera module.

The optical lens 111 at the bottom of the lens subassembly 11 is connected to the top of the lens holder 22 through the connecting portion 1113. Further, the optical lens assembly 10 and the photosensitive device 20 are assembled to form the camera module.

When the optical lens 111 replaces the diaphragm in the lens assembly, the first optical lens 111 or one of the optical lenses 111 functions as the diaphragm, and the blackening process and the matting process are performed on the photosensitive area 1111 of the optical lens 111 serving as the diaphragm to ensure that the optical lens have the function of the conventional diaphragm and then replaces the diaphragm for assembly. In the present embodiment, the first optical lens 111 arranged at the top of the lens subassembly 11 is specially processed to replace the diaphragm in the conventional camera module; and it is worth mentioning that another optical lens 111 in the lens subassembly 11 may alternatively be processed to replace the diaphragm. The photosensitive area of the optical lens 111 is provided with a light beam entering hole 1114, and the blackening process and the matting process are performed on all areas except an aperture position of the first optical lens 111 to form a non-photosensitive area, so that the size of the light beam entering hole 1114 can be controlled within a reasonable range, thus the lights can pass through the light beam entering hole 1114 and the size of the light beam is limited.

Further, in the conventional camera module, each lens is fixed by mounting the optical lens in a black objective lens barrel structural member; and the conventional lens barrel structural member not only plays the role of bearing and protecting the optical lens, but also has a function of blocking external lights, and can prevent the external lights from entering the camera module through a portion of the camera module other than the light entering portion, thus effectively avoiding affecting the imaging quality of the camera module.

In the present disclosure, a light blocking portion 1115 is arranged at the edge of the lens subassembly 11, and the blackening process and the matting process are performed on the edge of each optical lens 111 to form the light blocking layer; when the optical lenses 111 are assembled to form the lens subassembly 11, the light blocking layer at each edge forms the light blocking portion 1115 of the optical lens assembly 10, and the light blocking portion has a light blocking effect and can prevent external lights from entering into the camera module through a portion other than the light beam entering hole 1114; and the light blocking portion 1115 replaces the conventional black objective lens barrel structural member and can ensure the imaging quality of the camera module.

In addition, the external structure of the optical lens assembly 10 can be further provided with a lens barrel structural member, and the lens subassembly 11 is mounted in the lens barrel structural member, so that the lens barrel structural member plays a role in protecting and strengthening the lenses and has no actual influence on the optical system. On the basis of the present preferred embodiment, if the lens barrel structural member is mounted on the outer side of the light blocking portion 1115, since the light blocking portion 1115 already has a light blocking effect, the lens barrel structural member has a wide selection range, can be made of any material, such as transparent or non-transparent material, thereby providing a wide choice for production and manufacture, which is beneficial to saving the manufacturing cost. In addition, by replacing the conventional lens barrel structural member with the blackening process and the matting process, the machining precision is increased, the thickness is reduced, stray lights of the optical system is reduced, and the imaging quality and the manufacturing yield are improved.

In the present preferred embodiment, the blackening process and the matting process are suitable to be selected from one or more of paint spraying, ink coating, screen printing, photoetching, and other methods.

When assembling the camera module, the optical lens assembly 10 and the photosensitive device 20 are assembled first, and then the optical lens assembly 10 is mounted at the top of the photosensitive device 20 according to an optical path to form the camera module.

When assembling the optical lens assembly 10, the blackening process and the matting process can be performed on each optical lens 111 before assembly to form the photosensitive area 1111, the non-photosensitive area 1112, the connecting portion 1113, the light beam entering hole 1114, and the light blocking portion 1115, and then the optical lenses 111 can be embedded and assembled in sequence; the connecting portions 1113 of the optical lenses 111 connect optical lenses together to form the lens subassembly 11; and the optical lens 111 provided with the light beam entering hole 1114 is assembled at the uppermost layer of the lens subassembly 11 to ensure that this optical lens 111 functions as the diaphragm for receiving the incident light beam and limit the size of the incident light beam.

In addition, before assembly, only the photosensitive area 1111, the non-photosensitive area 1112, and the connecting portion 1113 may be formed by performing the blackening process and the matting process on the optical lenses; after the assembly is completed, the blackening process and the matting process are performed on the optical lens 111 at the top to form the light beam entering hole 1114, and the blackening process and the matting process are performed on the edge of each optical lens 111 to form the light blocking portion 1115 to prevent external lights from entering into the optical lens assembly 10 through the edge portion to affect the imaging quality.

In addition, alternatively, the lens subassembly 11 formed by embedding the optical lenses 111 may be assembled to the top of the lens holder 22 first, and then the blackening process and the matting process are performed on the edge of each optical lens 111 to form the light blocking portion 1115, thereby forming the optical lens assembly 10 and completing the assembly of the camera module.

When the lens barrel structural member is not used, the last optical lens 111 in the optical lens assembly 10 is directly assembled to the top of the lens holder 22 through the connecting portion 1113 of the optical lens to complete the assembly of the camera module. If the lens barrel structural member is used, the lens subassembly 11 is mounted in the lens barrel structural member in advance, and then the lens barrel structural member is mounted on the top of the lens holder 22 to complete the assembly of the camera module.

It is worth mentioning that a material used for the blackening process and the matting process of the non-photosensitive area of the optical lens 111 is suitable to be selected from a black adhesive which not only can be used for performing the blackening process and the matting process on each optical lens 111 to form the connecting portion 1113 and the light blocking portion 1115 without the conventional diaphragm and lens barrel structural member, but also has viscosity to embed and assemble the optical lenses 111 to form the lens subassembly 11 without the conventional spacer ring, which is beneficial to reducing the volume of the camera module and improving the imaging quality.

Figure 5:
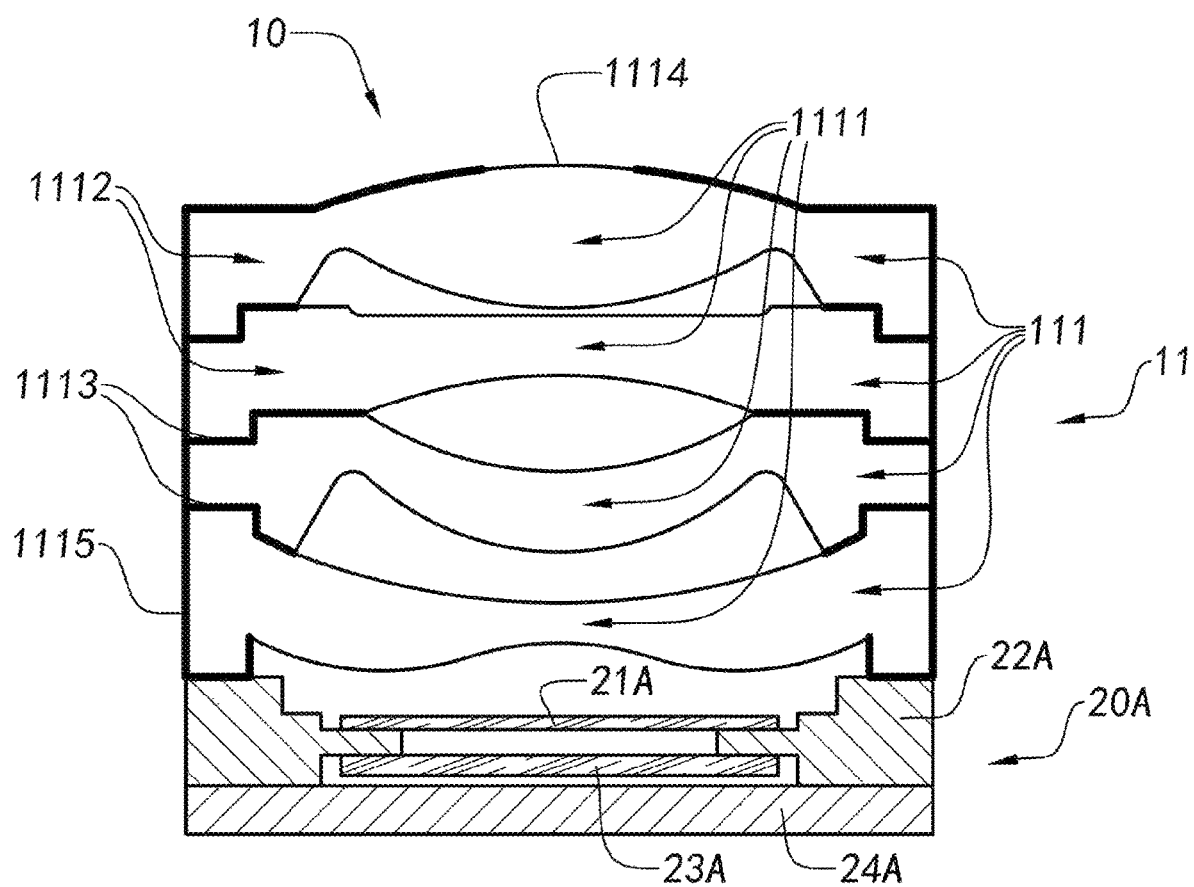
FIG. 5 is a schematic cross-sectional diagram of a variation implementation of the camera module according to the first preferred embodiment of the present disclosure.

FIG. 5 is a variation implementation of the camera module according to the first preferred embodiment. As shown in FIG. 5, the camera module in the first preferred embodiment is varied, where the changed part is the photosensitive device; and in the variation implementation, a photosensitive device 20A is connected to the optical lens assembly 10 of the camera module, and the structure of the optical lens assembly 10 is the same as that in the first preferred embodiment. The photosensitive device 20A includes a color filter 21A, a lens holder 22A, a photosensitive chip 23A and a circuit board 24A; the photosensitive device 20A adopts a flip chip; and the photosensitive chip 23A is located at the bottom of the lens holder 22A and is directly connected to the lens holder 22A, the photosensitive chip 23A and the color filter 21A are located at the top and the bottom of a boss on the inner wall of the lens holder 22A respectively, the photosensitive chip 23A is separated from the circuit board 24A, and the lens holder 22A has an electrical function which can ensure the imaging of the camera module.

In the present preferred embodiment, the height of the photosensitive device 20A is small, which not only can meet assembly requirements of a module with a small back focal length, but also further shortens the length of a tolerance chain of the assembly, minimizes the tolerance of the relative assembly position between the photosensitive chip 23A and the optical lens assembly 10, and improves the assembly precision. Moreover, the small height is conductive to reducing the back focus limit of the camera module to further reduce the height size of the module, and facilitate the development of the light and thin camera module. In addition, since the photosensitive chip 23A is directly arranged on the lens holder 22A, and is not necessary to be mounted on the circuit board 24A, the affection of unevenness of the circuit board on the photosensitive chip can be eliminated and the imaging quality of the camera module is further ensured.

Figure 6A:
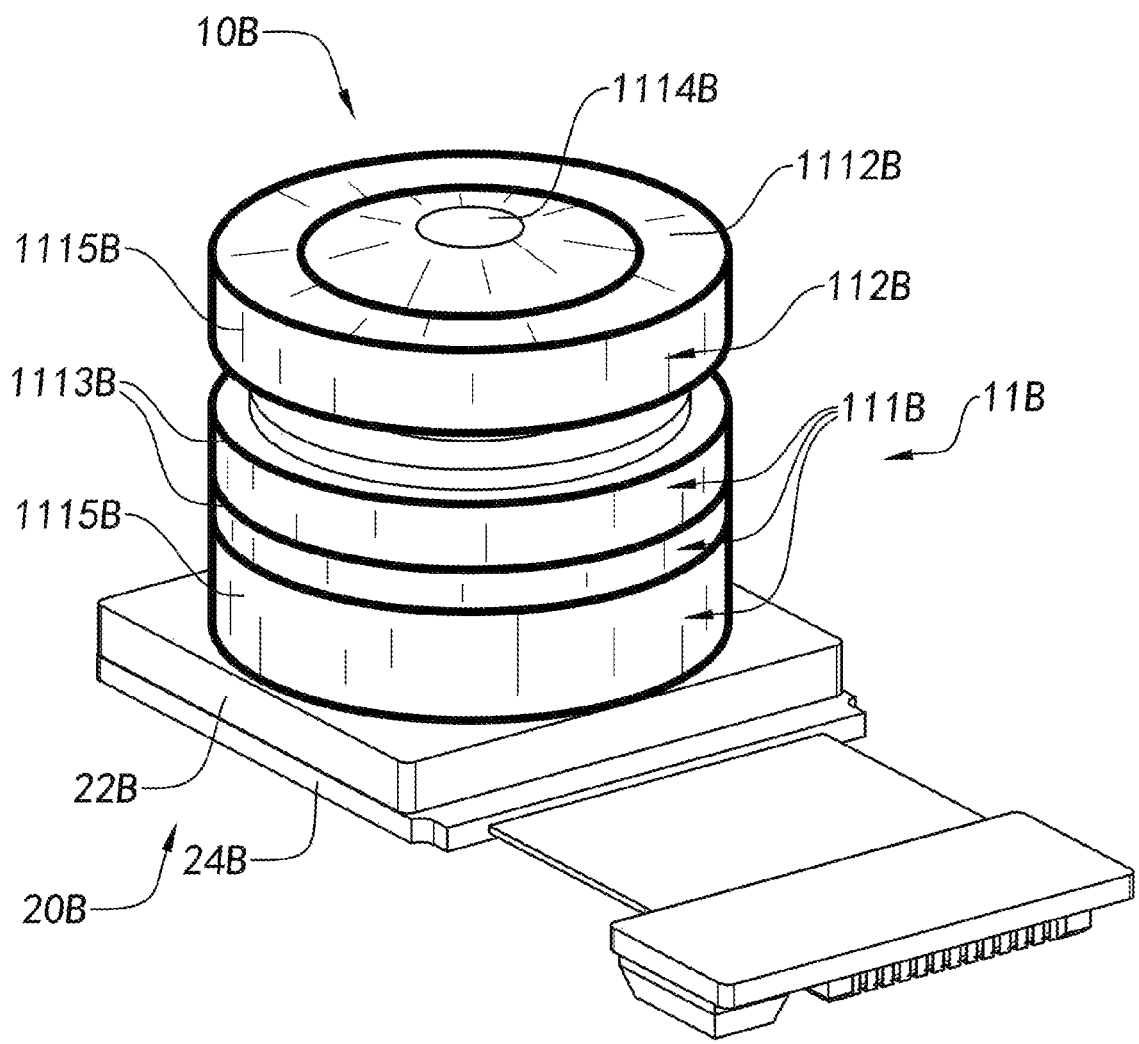
FIG. 6A is a schematic cross-sectional diagram of a camera module according to a second preferred embodiment of the present disclosure.
Figure 6B:
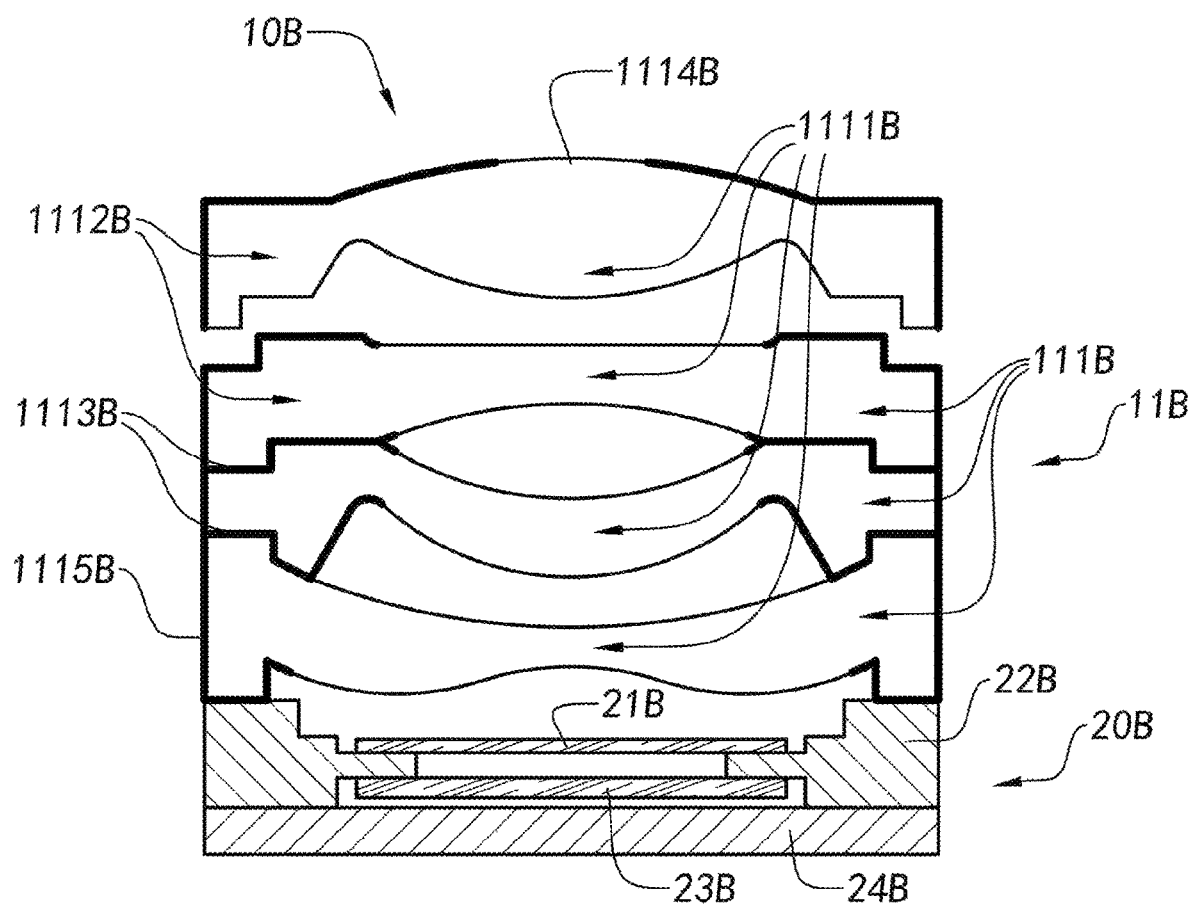
FIG. 6B is a three-dimensional structure diagram of the camera module included in an optical system structure according to the second preferred embodiment of the present disclosure.
Figure 7:
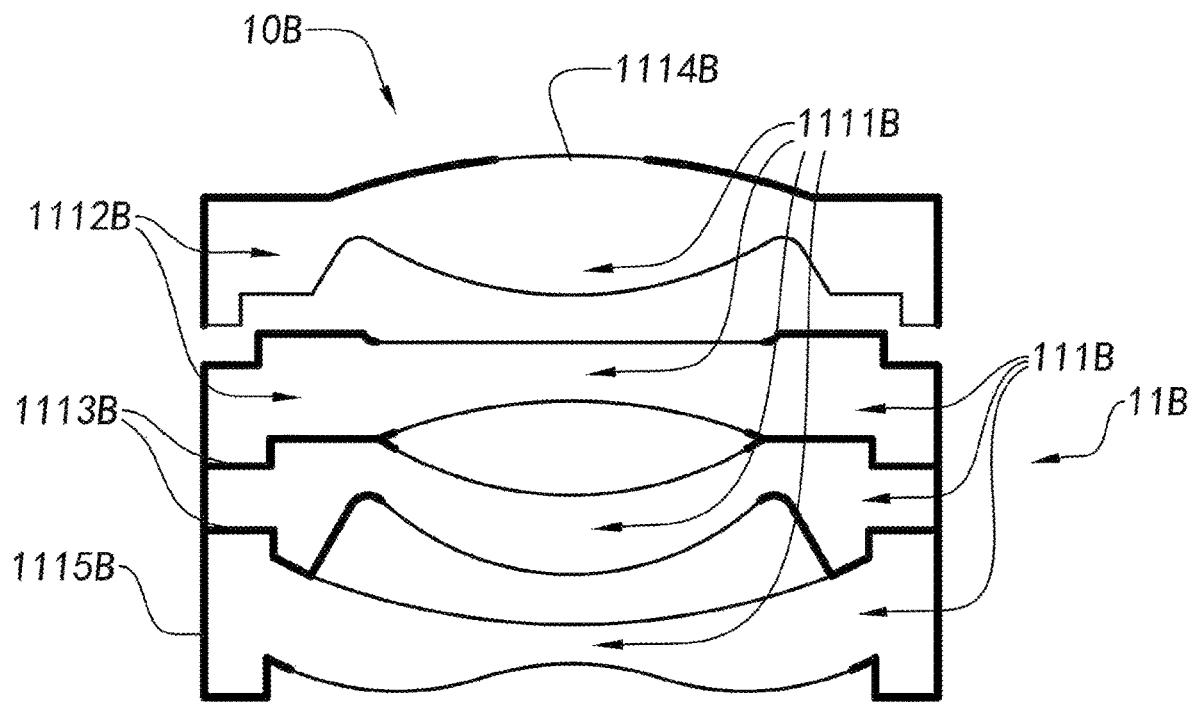
FIG. 7 is a schematic cross-sectional diagram of an optical lens assembly according to the second preferred embodiment of the present disclosure.

Referring to FIG. 6A to FIG. 7, a second specific implementation of the optical system structure provided by the present disclosure will be explained. As shown in FIG. 6A to FIG. 7, an camera module includes an optical lens assembly 10B and a photosensitive device 20B; the photosensitive device 20B includes a color filter 21B, a lens holder 22B, a photosensitive chip 23B and a circuit board 24B, and the color filter 21B is mounted in an internal space at the top of the lens holder 22B; the photosensitive chip 23B is mounted above the circuit board 24B, and is located inside the lens holder 22B; the circuit board 24B is mounted at the bottom of the lens holder 22B, and the photosensitive chip 23B is not in direct contact with the lens holder 22B and is separated from the lens holder 22B; the optical lens assembly 10B includes a lens subassembly 11B that includes a plurality of optical lenses 111B, and the optical lenses 111B are sequentially embedded and assembled to form the lens subassembly 11B; the lens subassembly 11B is mounted on a photosensitive path of the photosensitive chip 23B and at the top of the lens holder 22B; when lights reflected by an object enters into the camera module through the optical lens assembly 10B, the lights are received and photoelectrically converted by the photosensitive chip 23B, so that the camera module can generate images related to the object.

In the optical lens assembly 10B, by designing an optical path structure for the optical lenses 111B, for the optical lens assembly 10B, components such as a spacer ring, a diaphragm, and a lens barrel structural member are omitted, tolerances brought in processes of assembling the spacer ring, the diaphragm, and the lens barrel structural member are avoided, the machining precision is improved, the volume is reduced and the imaging quality is improved.

Specifically, according to the optical path design, a partial area of the optical lens 111B is opaqued to ensure that each optical lens 111B has a photosensitive area 1111B and a non-photosensitive area 1112B, where in the present preferred embodiment, the non-photosensitive area 1112B is formed by performing the blackening process and the matting process on the optical lens 111B.

Further, the non-photosensitive area 1112B of the optical lens 111B is coated with a black adhesive to form a connecting portion 1113B; the connecting portion 1113B has viscosity, and is suitable for embedding and assembling the optical lenses 111B together to form the lens subassembly 11B; and in the optical lens assembly 10B, each optical lens 111B is embedded and assembled with another one through the connecting portion 1113B without the spacer ring used for assembling lenses in the conventional camera module, the connecting portion 1113B is located at the same position as the spacer ring in the conventional lens assembly, and the function of the connecting portion is the same as that of the spacer ring. The assembly having lenses directly embedded has a low assembly accuracy, a low cost and a lower tilt tolerance, which is beneficial for ensuring the production yield and efficiency of the camera module and improving the imaging quality of the camera module.

The optical lens 111B at the bottom of the lens subassembly 11B is connected to the top of the lens holder 22B through the connecting portion 1113B, such that the optical lens assembly 10B and the photosensitive device 20B are assembled to form the camera module.

When the optical lenses 111B replace diaphragms in the lens assembly, the first optical lens 111B or one of the optical lenses 111B functions as the diaphragm, and the blackening process and the matting process are performed on the photosensitive area 1111B of the optical lens 111B serving as the diaphragm to ensure that the optical lens has the function of the conventional diaphragm and replaces the diaphragm for assembly. In the present embodiment, the first optical lens 111B arranged at the top of the lens subassembly 11B is specially processed to replace the diaphragm in the conventional camera module; and it is worth mentioning that another optical lens 111B in the lens subassembly 11B may alternatively be processed to replace the diaphragm. The photosensitive area of the optical lens 111B is provided with a light beam entering hole 1114B, and the blackening process and the matting process are performed on all areas of the first optical lens 111 except an aperture position of the first optical lens 111B to form a non-photosensitive area, so that the size of the light beam entering hole 1114B can be controlled within a reasonable range to ensure that the light beam entering hole 1114B can not only allow lights to pass through the light beam entering hole 1114B but also limit the size of the light beam.

In the present disclosure, a light blocking portion 1115B is arranged at the edge of the lens subassembly 11B, that is, the blackening process and the matting process are performed on the edge of each optical lens 111B to form a light blocking layer; when the optical lenses 111B are assembled to form the lens subassembly 11B, the light blocking layer at each edge forms the light blocking portion 1115B of the optical lens assembly 10B, and the light blocking portion has a light blocking effect and can prevent external lights from entering into the camera module through a portion other than the light beam entering hole 1114B; and the light blocking portion 1115B replaces the conventional black objective lens barrel structural member and can ensure the imaging quality of the camera module.

At least one of the optical lenses 111B in the lens subassembly 11B is an adjustable lens, the adjustable lens is pre-assembled in the lens subassembly 11B and an assembly position of the adjustable lens is suitable to be adjusted in at least one direction. In the present preferred embodiment, the first optical lens 111B is set as an adjustable lens 112B and the rest optical lenses are fixed lenses. The adjustable lens 112B is pre-assembled in the optical lens assembly 10B, so that the optical lens assembly 10B is an optical lens assembly with an adjustable optical center; and after the optical lens assembly is assembled on the photosensitive device 20B, the camera module is powered on to acquire imaging of the camera, the adjustment amount required by the adjustable lens 112B is calculated by using software, and the adjustable lens 112B is correspondingly adjusted to ensure that after the imaging of the camera module meets a resolution requirement, the adjustable lens 112B is fixed, for example, the assembly of the camera module is completed by adhesive dispensing and curing. The adjustable lens 112B can enable the camera module to complete calibration of the camera module in a production process, which is beneficial to ensuring the imaging quality of the camera module and improving the manufacturing yield and production efficiency of the camera module.

It is worth mentioning that a material used for the blackening process and the matting process of the non-photosensitive area of the optical lens 111B is suitable to be selected from a black adhesive which not only can be used for performing the blackening process and the matting process on each optical lens 111B to form the connecting portion 1113B and the light blocking portion 1115B without the conventional diaphragm and lens barrel structural member, but also has viscosity to embed and assemble the optical lenses 111B to form the lens subassembly 11B without the conventional spacer ring, which is beneficial to reducing the volume of the camera module and improving the imaging quality.

It is worth mentioning that the other optical lenses 111B in the lens subassembly 11B can also be used as adjustable lenses, can be located at any position in the lens subassembly 11B, or two or more of the optical lenses 111 can be fixedly assembled together as an adjustable lens, and then the adjustable lens is pre-assembled on the other fixedly-assembled optical lenses 111, so as to facilitate appropriate adjustment in subsequent processes.

Figure 9:
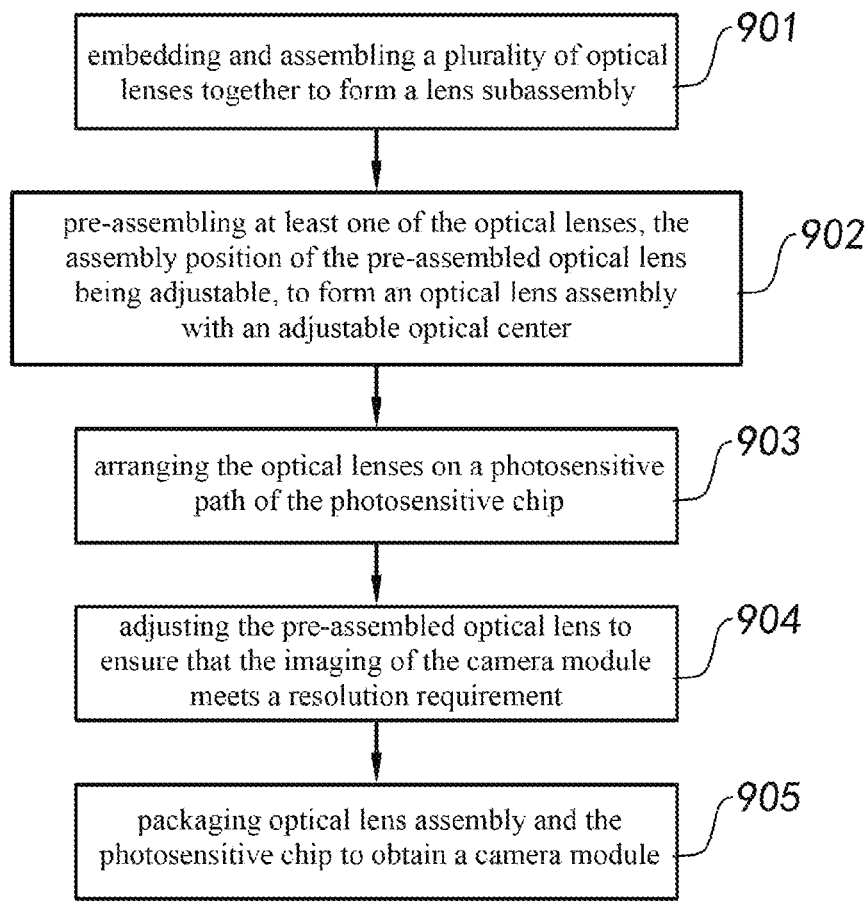
FIG. 9 is a flow diagram of an assembly method of the camera module according to the above preferred embodiments of the present disclosure.

Referring to FIG. 9, the assembly method of the camera module according to the present disclosure includes:

step (901): embedding and assembling a plurality of optical lenses 111B together to form the lens subassembly 11B;

step (902): pre-assembling at least one of the optical lenses 111B, the assembly position of the pre-assembled optical lens being adjustable, to form the optical lens assembly 10B with an adjustable optical center;

step (903): arranging the optical lens assembly 10B on a photosensitive path of the photosensitive chip 23B of the photosensitive device 20B;

step (904): adjusting the pre-assembled optical lens to ensure that the imaging of the camera module meets a resolution requirement; and step (905): packaging the optical lens assembly 10B and the photosensitive device 20B to form a camera module.

Figure 10:
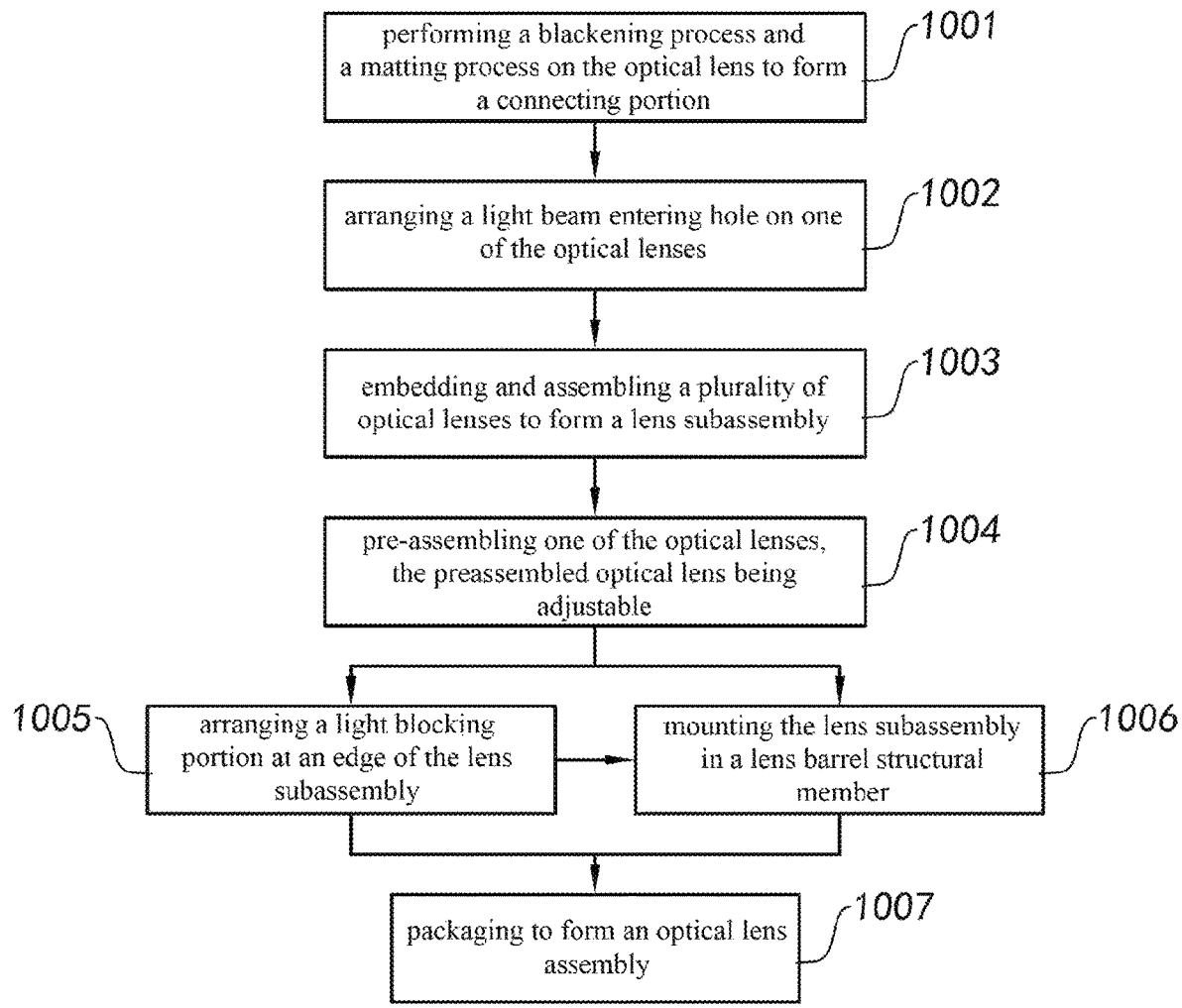
FIG. 10 is a flow diagram of an assembly method of the optical lens assembly according to the above preferred embodiments of the present disclosure.

Referring to FIG. 10, the assembly method of the optical lens assembly according to the present disclosure includes:

step (1001): performing a blackening process and a matting process on each optical lens 111B to form the connecting portion 1113B;

step (1002): forming the light beam entering hole 1114B on one of the optical lenses 111B;

step (1003): embedding and assembling a plurality of optical lenses 111B together to form the lens subassembly 11B;

step (1004): pre-assembling at least one of the optical lenses 111B as an adjustable lens 112B;

step (1005): arranging the light blocking portion 1115B at the edge of the lens subassembly 11B;

step (1006): mounting the lens subassembly in a lens barrel structural member; and step (1007): packaging the optical lens assembly 10B.

The optical lens assembly 10B prepared by the assembly method in FIG. 10 is pre-assembled with the photosensitive device 20B, and the camera module is manufactured by the assembly method of the camera module in FIG. 9.

In the steps (901) and (902), the steps (1001) to (1005) are executed when assembling the lens subassembly 11B.

Specifically, in the assembly process of the camera module in the present preferred embodiment, the blackening process and the matting process may be performed on each optical lens 111B before assembly to form the photosensitive area 1111B, the non-photosensitive area 1112B, the connecting portion 1113B, the light beam entering hole 1114B, and the light blocking portion 1115B, and then the optical lenses 111B can be embedded and assembled in sequence. That is, fixed lenses in the optical lenses 111B are fixedly assembled together through the connecting portions 1113B and fixedly connected with the photosensitive device 20B in sequence, and then the adjustable lens 112B is further pre-assembled at the top of the lens subassembly 11B; during subsequent calibration, the assembly position of the adjustable lens 112B is suitable to be adjusted in at least one direction so as to calibrate the imaging of the camera module to ensure that the camera module meets an expected resolution requirement; and in the present preferred embodiment, the adjustable lens 112B may replace the conventional diaphragm, and the adjustable lens 112B is provided with the light beam entering hole 1114B to ensure that the adjustable lens 112B functions as the diaphragm for receiving an incident light beam and limiting the size of the incident light beam.

In addition, before assembly, the photosensitive area 1111B, the non-photosensitive area 1112B, and the connecting portion 1113B may be formed by performing the blackening process and the matting process only on the optical lenses; after the assembly is completed, the blackening process and the matting process are performed on the adjustable lens 112B at the top to form the light beam entering hole 1114B, and the blackening process and the matting process are performed on the edge of each optical lens 111B to form the light blocking portion 1115B to prevent external lights from entering into the optical lens assembly 10B from a side portion to affect the imaging quality.

In addition, the lens subassembly 11B formed by embedding the optical lenses 111B can be assembled at the top of the lens holder 22B first, and then the blackening process and the matting process are performed on the edge of each optical lens 111B to form the light blocking portion 1115B, thereby forming the optical lens assembly 10B and completing the assembly of the camera module.

In the step (903), when the lens barrel structural member is not used, the last optical lens 111B in the optical lens assembly 10B is directly assembled to the top of the lens holder 22B through the connecting portion 1113B of the optical lens to complete the assembly of the camera module. If the lens barrel structural member is used, the lens subassembly 11B is mounted in the lens barrel structural member in advance, that is, the step (1006) is executed, and then the lens barrel structural member is mounted at the top of the lens holder 22B to complete the assembly of the camera module, where the assembly position of the adjustable lens 112B in the lens barrel structural member is suitable to be adjusted.

In the step (904), the pre-assembled camera module is powered on to acquire imaging of the camera module, the adjustment amount required by the adjustable lens 112B is calculated by using software, the optical center of the optical lens assembly 10B is adjusted by adjusting the adjustable lens 112B, and after the adjustable lens 112B is appropriately adjusted, the central axis of the optical lens assembly 10B coincides with the central axis of the photosensitive chip 23B or the deviation between the central axes is within an allowable range, so that the imaging of the camera module meets a resolution requirement.

In the step (905), after the adjustable lens 112B is adjusted, the imaging of the camera module meets an expected requirement, and then the adjustable lens 112B is fixed, for example, by adhesive dispensing and curing, to complete the assembly of the camera module.

It is worth mentioning that alternatively optical lenses 11B may be embedded and assembled with each other, and fixed together to form a lens subassembly, and then the lens subassembly is assembled with the photosensitive device 20B to form a camera module, where the assembly position of each optical lens 11B cannot be adjusted.

Figure 8:
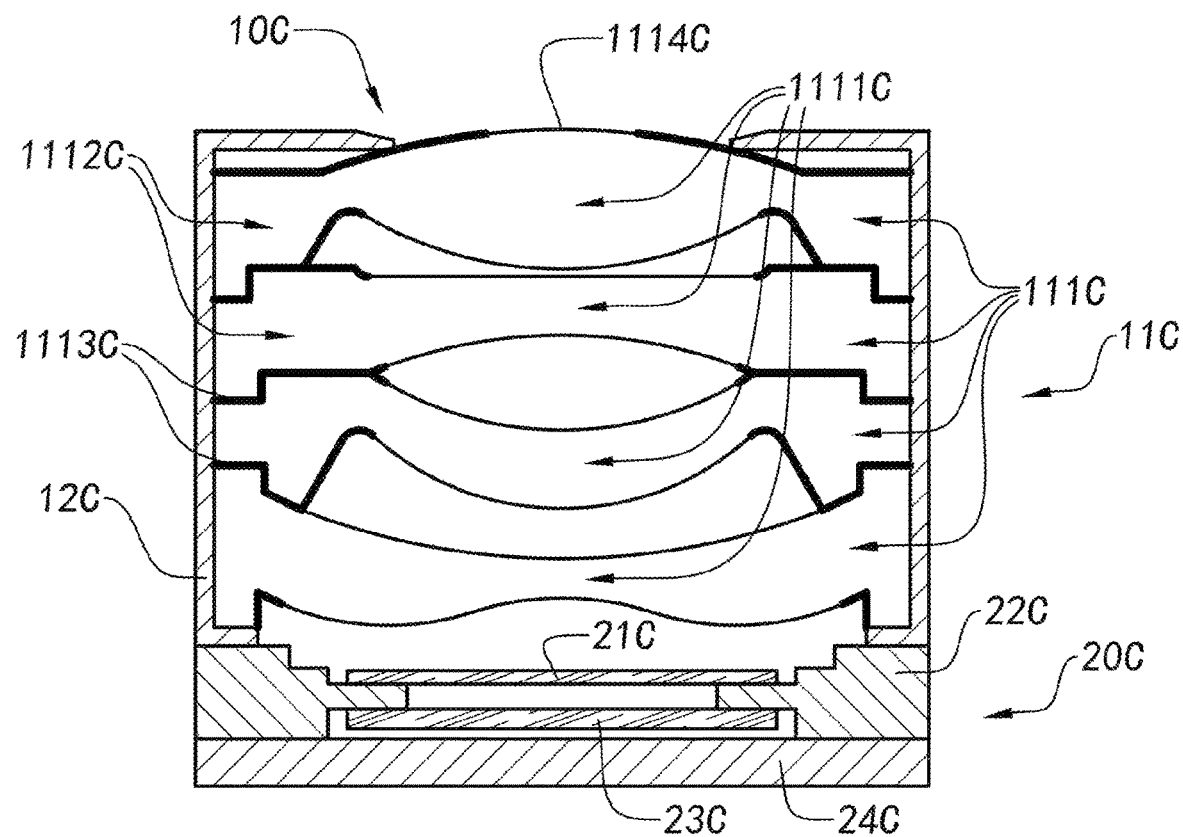
FIG. 8 is a schematic cross-sectional diagram of a camera module according to a third preferred embodiment of the present disclosure.

Referring to FIG. 8, a third specific implementation of the optical system structure provided by the present disclosure will be illustrated. As shown in FIG. 8, a camera module includes an optical lens assembly 10C and a photosensitive device 20C; the photosensitive device 20C includes a color filter 21C, a lens holder 22C, a photosensitive chip 23C and a circuit board 24C; the photosensitive device 20C adopts a flip chip; the photosensitive chip 23C is connected to the bottom of the lens holder 22C and is directly connected with the lens holder 22C; the photosensitive chip 23C and the color filter 21C are located at the top and the bottom of a boss on the inner wall of the lens holder 22C respectively; the photosensitive chip 23C is separated from the circuit board 24C; the lens holder 22C has an electrical function and cannot ensure the imaging of the camera module; the optical lens assembly 10C includes a lens subassembly 11C and a lens barrel structural member 12C; the lens subassembly 11C is mounted in an accommodating cavity of the lens barrel structural member 12C to fix the lens subassembly 11C; the lens barrel structural member 12C is fixedly assembled at the top of the lens holder 22C to ensure that the lens subassembly 11C is located on a photosensitive path of the photosensitive chip 23C; when lights reflected by an object enters the camera module through the optical lens assembly 10C, the photosensitive chip 23C receives and photoelectrically converts the lights, so that the camera module can generate an image related to the object.

Further, the lens subassembly 11C includes a plurality of optical lenses 111C; through the blackening process and the matting process of each optical lens 111C, each optical lens 111C forms a photosensitive area 1111C and a non-photosensitive area 1112C; the non-photosensitive area 1112C of the optical lens 111C is coated with a black adhesive to form a connecting portion 1113B which has viscosity to facilitate overlappingly assembling the optical lenses 111C in the lens barrel structural member 12C in sequence; the edge of each optical lens 111C is connected to the inner wall of the lens barrel structural member 12C to fix the lens subassembly 111C; and areas other than the non-photosensitive area 1112C are photosensitive areas 1111C.

The first optical lens 111C at the top of the lens subassembly 11C is provided with a light beam entering hole 1114B to facilitate entry of the incident lights and limiting the size of the incident lights so as to replace the diaphragm in the conventional camera module.

It is worth mentioning that the formation of the non-photosensitive area 1112C of each optical lens 111C is achieved by performing the blackening process and the matting process on the optical lens 111C, which is suitable for using a black adhesive, and the black adhesive can not only block lights but also have viscosity, thus directly connects the optical lenses 111C, avoiding the use of the conventional spacer ring, and alternatively, the optical lenses 111C can be connected to the lens barrel structural member 12C. The black adhesive is suitable to be implemented by paint spraying, ink coating, screen printing, photoetching, and other methods.

In the present preferred embodiment, if the blackening process and the matting process are performed on the edge of each optical lens 111C to form a light blocking layer, the lens barrel structural member 12C can be transparent or opaque, and if the opaquing process is not performed on the edge of each optical lens 111C, the lens barrel structural member 12C is a black objective lens barrel structural member made of an opaque material.

It should be understood by those skilled in the art that the embodiments of the present disclosure shown in the above description and the accompanying drawings are only examples and do not limit the present disclosure. The objective of the present disclosure has been achieved fully and effectively. The functional and structural principles of the present disclosure have been shown and described in the embodiments. Without departing from the principles described above, the embodiments of the present disclosure may have any variations or modifications.

What is claimed is:

1. An assembly method of an optical lens assembly, comprising:
   (a) sequentially stacked a plurality of optical lenses in an optical axis direction to form a lens subassembly, wherein each of the optical lenses comprises a connecting portion, by which the optical lenses are overlap with each other in the optical axis direction;
   (b) forming a light beam entering hole on one of the optical lenses in the lens subassembly; and
   (c) packaging the optical lens assembly, and
   (c1) disposing the lens subassembly on a top of a lens holder, wherein a lowermost optical lens in the lens subassembly is directly connected to the top of the lens holder through a connecting portion provided thereon,
   wherein, each of the optical lenses is directly connected to an adjacent lens of the lenses by its connecting portion, thereby forming the optical lens assembly without any spacers and lens barrels,
   wherein in the method, a connecting portion of a first optical lens is formed by coating a black adhesive on a surface of the first optical lens and is adapted to embed and assembly the optical lenses, the first optical lens being any one of the optical lenses,
   wherein in the step (a), at least one of the optical lenses is an adjustable lens, and an assembly position of the adjustable lens is suitable to be adjusted in at least one direction, wherein the step (c), after an optical center of the optical lens is corrected through the adjustable lens, adhesive dispensing and curing are performed on the adjustable lens to fix the adjustable lens, thereby completing the assembly of the optical lens assembly.

2. The assembly method of the optical lens assembly according to claim 1, wherein in the step (a), before assembling the optical lenses, a blackening process and a matting process are performed on each optical lens to form a non-photosensitive area, the entire optical lens except the non-photosensitive is a photosensitive area, and the connecting portion is arranged in the non-photosensitive area.

3. The assembly method of the optical lens assembly according to claim 2, wherein in the step (b), the optical lens mounted on the top of the lens subassembly is provided with the light beam entering hole, and for the optical lens on the top of the lens subassembly, the light beam entering hole is formed in the photosensitive area and a blackening process and a matting process are performed on the entire optical lens except the light beam entering hole to form a non-photosensitive area to limit the size of an entering light beam.

4. The assembly method of the optical lens assembly according to claim 3, wherein in the step (a), at least one of the optical lenses is an adjustable lens, and an assembly position of the adjustable lens is suitable to be adjusted in at least one direction.

5. The assembly method of the optical lens assembly according to claim 1, wherein in the step (b), the optical lens mounted on the top of the lens subassembly is provided with the light beam entering hole, and for the optical lens on the top of the lens subassembly, the light beam entering hole is formed in a photosensitive area and a blackening process and a matting process are performed on the entire optical lens except the light beam entering hole to form a non-photosensitive area to limit the size of an entering light beam.

6. The assembly method of the optical lens assembly according to claim 5, wherein in the step (a), at least one of the optical lenses is an adjustable lens, and an assembly position of the adjustable lens is suitable to be adjusted in at least one direction.

7. The assembly method of the optical lens assembly according to claim 1, wherein in the step (a), at least one of the optical lenses is an adjustable lens, and an assembly position of the adjustable lens is suitable to be adjusted in at least one direction.

8. The assembly method of the optical lens assembly according to claim 1, wherein in the method, the step (b) is performed before an execution of the step (a).

9. The assembly method of the optical lens assembly according to claim 1, further comprising step (d): arranging a light blocking portion at an edge of the lens subassembly to blocking lights, wherein the step (d) is included in the step (a), performed between executions of the steps (a) and (b), or performed between executions of the steps (b) and (c).

10. The assembly method of the optical lens assembly according to claim 9, wherein in the step (d), the light blocking portion is formed by performing a blackening process and a matting process on an edge of each of the optical lenses, and the blackening process and the matting process are suitable to be performed before assembling the optical lenses, or after assembling the optical lenses.

11. The assembly method of the optical lens assembly according to claim 1, wherein in the method, a blackening process and the matting process are suitable to be performed on the optical lenses by one or more of paint spraying, ink coating, screen printing and photoetching.

12. An assembly method of an optical lens assembly, comprising:
- (a) sequentially stacked a plurality of optical lenses in an optical axis direction to form a lens subassembly, wherein each of the optical lenses comprises a connecting portion, by which the optical lenses are overlap with each other in the optical axis direction;
- (b) forming a light beam entering hole on one of the optical lenses in the lens subassembly; and
- (c) packaging the optical lens assembly, and
- (c1) disposing the lens subassembly on a top of a lens holder, wherein a lowermost optical lens in the lens subassembly is directly connected to the top of the lens holder through a connecting portion provided thereon, wherein, each of the optical lenses is directly connected to an adjacent lens of the lenses by its connecting portion, thereby forming the optical lens assembly without any spacers and lens barrels, wherein in the step (a), at least one of the optical lenses is an adjustable lens, and an assembly position of the adjustable lens is suitable to be adjusted in at least one direction, and wherein in the method, the adjustable lens is arranged at the top of the lens subassembly, and an optical center of the optical lens is calibrated by adjusting the adjustable lens.

* * * * *